United States Patent [19]

Sakamoto

[11] Patent Number: 4,926,270
[45] Date of Patent: May 15, 1990

[54] DRIVING METHOD FOR A STEPPING MOTOR AND SHEET CONVEYING APPARATUS USING THE DRIVING METHOD

[75] Inventor: Masahiro Sakamoto, Tokyo, Japan

[73] Assignee: Canon Kabushiki Kaisha, Tokyo, Japan

[21] Appl. No.: 157,637

[22] Filed: Feb. 8, 1988

[30] Foreign Application Priority Data

Feb. 16, 1987 [JP] Japan .................. 62-31580

[51] Int. Cl.⁵ .................. H04N 1/10; H02P 8/00
[52] U.S. Cl. .................. 358/498; 358/496; 318/696
[58] Field of Search .......... 358/285, 293, 294, 474, 358/496, 498; 318/685, 696

[56] References Cited

U.S. PATENT DOCUMENTS 4,700,321 10/1987 Ward .................. 318/696
4,789,816 12/1988 Yamamoto et al. ........ 318/696

FOREIGN PATENT DOCUMENTS

| 49-42236 | 4/1974 | Japan . | |
|---|---|---|---|
| 56-78273 | 6/1981 | Japan | 358/293 |
| 58-85669 | 5/1983 | Japan | 358/293 |
| 58-173967 | 10/1983 | Japan | 358/293 |
| 60-130965 | 7/1985 | Japan | 358/293 |
| 60-130966 | 7/1985 | Japan | 358/293 |
| 62-35762 | 2/1987 | Japan . | |

Primary Examiner—James J. Groody
Assistant Examiner—Randall S. Svihla
Attorney, Agent, or Firm—Fitzpatrick, Cella, Harper & Scinto

[57] ABSTRACT

This specification discloses a driving method for a stepping motor is provided with a time detecting step of detecting the time interval to between the generation of two a sheet conveyance commands, a rate setting step of setting a pulse rate in conformity with the time interval detected by the time detecting step, and the driving step of driving the stepping motor at the pulse rate set by the rate setting step. The specification also discloses a sheet conveying apparatus using such driving method.

12 Claims, 4 Drawing Sheets

DRIVING METHOD FOR A STEPPING MOTOR AND SHEET CONVEYING APPARATUS USING THE DRIVING METHOD

BACKGROUND OF THE INVENTION

1. Field of the Invention

This invention relates to a driving method for a stepping motor and a sheet conveying apparatus using the driving method.

More particularly, the present invention relates to a driving method for a stepping motor whereby a predetermined amount of feed of the stepping motor in a system in which, for example, the time interval of the generation of a drive command (a sheet conveyance command or the like) is not constant is driven by a predetermined number of pulse trains per said predetermined amount, and a sheet conveying apparatus using such method.

2. Related Background Art

There are numerous examples of a paper conveying systems in facsimile apparatus in which a stepping motor is used to convey paper. In one such example the line feed corresponding to one line of printed dots is accomplished by a plurality of steps (such as, for example, two steps/line or four steps/line) of the stepping motor, and heretofore, the step drive interval during the line feed (i.e., the pulse rate) has been fixed.

Now, in the case of the image transmission, for example, by G3 facsimile, the period of generation of a line feed command depends on the processing time for MH-coding or MR-coding line data read by a scanner. That is, in a complicated image portion, the run length is short and therefore a long time is required for the coding and thus, the period of generation of the line feed command becomes long. However, in a simple image portion, the run length is long and the coding thereof can be accomplished within a short time. Accordingly, the period of generation of the line feed command also becomes short. For this reason, the pulse rate of the conventional stepping motor has been set on the basis of the minimum period of generation of the line feed command, and is fixed.

FIG. 1 of the accompanying drawings is a waveform graph showing the axial displacement $D'_A$ of a stepping motor by the conventional stepping motor driving method.

In FIG. 1, a line advance signal LA (a line feed command) is shown as varying for each line feed. Accordingly, the interval between the points of variation shows the periods of generation A-D of the line feed command. Also, a drive pulse signal DP is set correspondingly to the minimum period of generation A of the line feed command, and the pulse rate is fixed by the relation between this period A and the four steps/line. Here, the pulse rate can be found from $$\text{Pulse rate} = \frac{\text{Number of steps}}{\text{Minimum Period of geration } A}.$$

Accordingly, if the minimum period of generation A is long, the pulse rate becomes small. The rotor is axially displaced for each pulse and moves along an ideal axial displacement signal IAD. However, if for example, the minimum period of generation A is as short as 5 ms and is still driven by four steps/line, the pulse rate is 800 pps, which means a very high speed. When the stepping motor is driven at such a pulse rate, overshoot or the undershoot from the influence of the inertia of the rotor occurs, and this often leads to the undesirable phenomenon of disordered condition of the rotor by damping.

That is, in the sections of the periods of generations A and B of FIG. 1, eight drive pulse signals DP continue and therefore, the rotor is considerably accelerated, and in the latter half of the period of generation B, the overshoot as shown by an axial displacement signal AAD occurs due to the moment of inertia of the rotor. The rotor then tries to return to a prescribed position b. This is the so-called phenomenon of damping. If at that time, the period of generation B is in the relation as shown in FIG. 1, the drive pulse signal DP generated at the beginning of the next period of generation C will flatly receive the return torque of the rotor and the driving energy may be offset thereby. Accordingly, although the axial displacement $D'_A$ of the rotor should originally reach the point of the axial displacement c within the section of the period of generation C, it stops at the point of the axial displacement b or at a point displaced a little therefrom. Thus, there has heretofore been the undesirable possibility that the phenomenon of disordered condition of the rotor is caused.

SUMMARY OF THE INVENTION

It is an object of the present invention to provide a driving method for a stepping motor which is capable of driving the stepping motor highly accurately and a sheet conveying apparatus using the driving method.

It is another object of the present invention to provide a driving method for a stepping motor which is capable of driving the stepping motor with high reliability and a sheet conveying apparatus using the driving method.

It is still another object of the present invention to provide a driving method for a stepping motor which is capable of accomplishing the conveyance of a sheet by the stepping motor at a high speed and a sheet conveying apparatus using the driving method.

It is yet still another object of the present invention to provide a driving method for a stepping motor which can obviate the phenomenon of disordered condition of a rotor and a sheet conveying apparatus using the method.

It is a further object of the present invention to provide a driving method for a stepping motor which can accomplish a predetermined amount of sheet conveyance by the stepping motor in a system wherein the time interval of the generation of a sheet conveyance command is not constant, at a high speed and high accuracy and with high reliability, and a sheet conveying apparatus using the driving method.

DESCRIPTION OF THE PREFERRED EMBODIMENTS

An embodiment which will hereinafter be described is a driving method for a stepping motor provided with the time detecting step of detecting the time interval of the generation of a sheet conveyance command, the rate setting step of setting a pulse rate in conformity with the time interval detected by said time detecting step, and the driving step of driving the stepping motor at the pulse rate set by said rate setting step.

Also, an embodiment which will hereinafter be described is a sheet conveying apparatus provided with time detecting means for detecting the time interval of the generation of a sheet conveyance command, rate setting means for setting a pulse rate in conformity with the time interval detected by said time detecting means, and driving means for driving a stepping motor at the pulse rate set by said rate setting means.

The embodiment which will hereinafter be described achieves the following effects by the above-described construction.

First, the time interval of the generation of a sheet conveyance command in a sheet conveying system is not constant. So, the time detecting means detects the time interval of the generation of the sheet conveyance command. The rate setting means sets the pulse rate for driving the stepping motor in conformity with the time interval detected by said time detecting means. The driving means drives the stepping motor at the pulse rate set by said rate setting means. Thereby, the drive pulse signal DP of the stepping motor is always properly distributed within the time interval of generation of the sheet conveyance command which changes from one moment to the next, and the inclination of the drive pulse signal DP is suppressed to thereby prevent the phenomenon of disordered condition of a rotor.

Embodiments of the present invention will hereinafter be described in detail with reference to the drawings.

Figure 1:
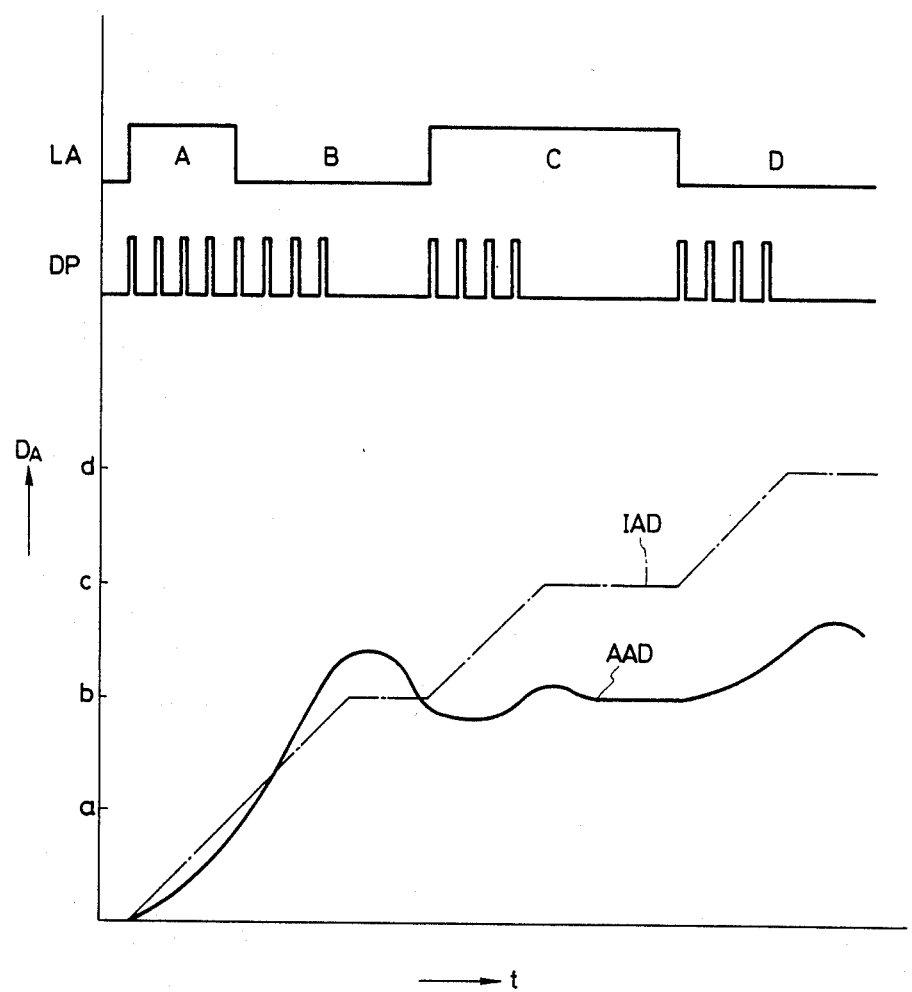
FIG. 1 is a waveform graph showing the manner of the motor axial displacement by the conventional stepping motor driving method.
Figure 2:
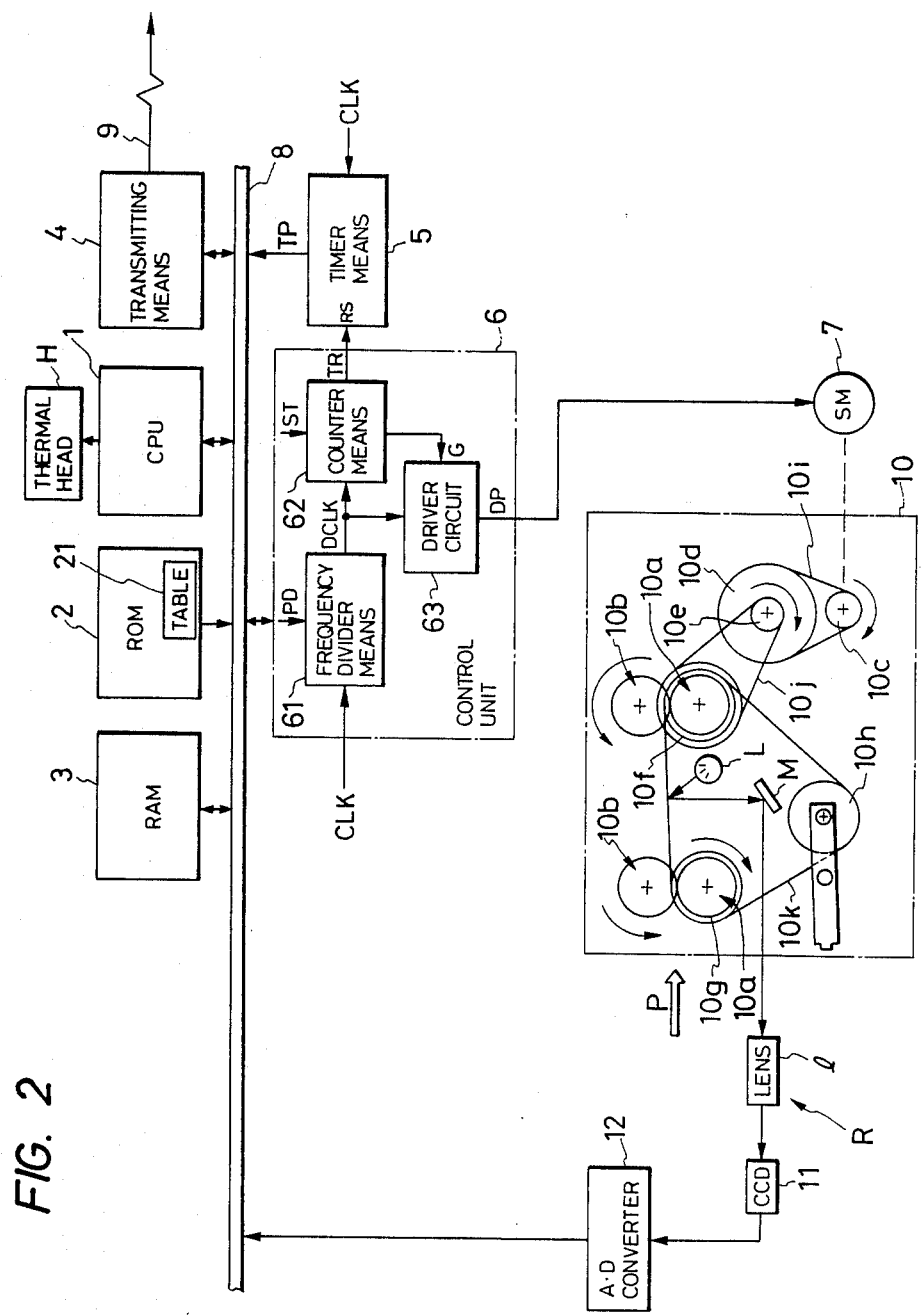
FIG. 2 is a block diagram of a sheet conveying apparatus according to an embodiment of the present invention.

FIG. 2 is a block diagram of a driving method for a stepping motor according to an embodiment of the present invention and a sheet conveying apparatus using the driving method. In FIG. 2, the reference numeral 1 designates a central processing unit (CPU) which conducts the main control of the apparatus. The reference numeral 2 denotes a read-only memory (ROM) storing therein the control program of the stepping motor of the embodiment as shown, for example, in FIG. 3 and table information 21 for reading out a pulse rate setting parameter PD from timer information to be described. The reference numeral 3 designates a random access memory (RAM) storing therein image data read by a reader unit R to be described, transmission image data obtained by encoding said image data into an MH code, and various types of intermediate information necessary for the control of the stepping motor 7. The reference numeral 4 denotes transmitting means for transmitting the transmission image data to the outside, the reference numeral 5 designates timer means for counting the time interval at which a line feed command for a sheet is generated, the reference numeral 6 denotes a control unit for the stepping motor, the reference numeral 7 designates the stepping motor (SM), the reference numeral 8 denotes a common bus of CPU 1, the reference numeral 9 designates a data transmission line, and the reference numeral 10 denotes a sheet conveying mechanism operatively associated with the stepping motor 7 to convey originals or recording sheets highly accurately. Letter H designates a thermal head controlled by said CPU so as to record an image corresponding to data on a sheet.

The sheet conveying mechanism 10 is comprised of two sets of rollers and operates by pairs of capstan rollers 10a and pressure contact rollers 10b. The transmission of the power of the stepping motor 7 to the capstan rollers 10a is accomplished through pulleys 10c, 10d, 10e, 10f, 10g, 10h and belts 10i, 10j, 10k. The tension of the belt 10k of the capstan rollers can be adjusted by moving the tension pulley 10h up and down. Thus, a sheet receives a conveying force from the capstan rollers 10a rotated by the drive of the stepping motor 7 and is conveyed between the capstan rollers 10a and the pressure contact rollers 10b.

The aforementioned reader unit R is comprised of an illuminating lamp L, a mirror M, a lens 1, CCD 11 and an A-D converter 12 provided along the original conveyance path to irradiate the image bearing surface of an original fed from the direction of arrow P. Accordingly, the image bearing surface of the original is irradiated with light by the lamp L while being conveyed by the rollers 10a and 10b. The reflected light therefrom is directed via the mirror M and the lens 1 to the CCD 11, whereby the information on the image bearing surface of the original is read. The data read by the CCD 11 is stored in the RAM 3 via the A-D converter 12 and the common bus 8.

In the control unit 6, the reference numeral 61 designates frequency divider means for frequency-dividing a reference clock signal CLK in accordance with the pulse rate setting parameter PD supplied from the CPU 1, and the reference numeral 62 denotes counter means for counting the frequency-divided clock signal DCLK output by the frequency divider means 61 by a predetermined number (in the embodiment, four) and generating a gate signal G of logic 1 during said counting period and generating a pulse signal TR at a point of time whereat said counting period terminates. The reference numeral 63 designates a driver circuit for amplifying and outputting the frequency-divided clock signal DCLK by a section in which the gate signal G is logic 1.

Figure 3:
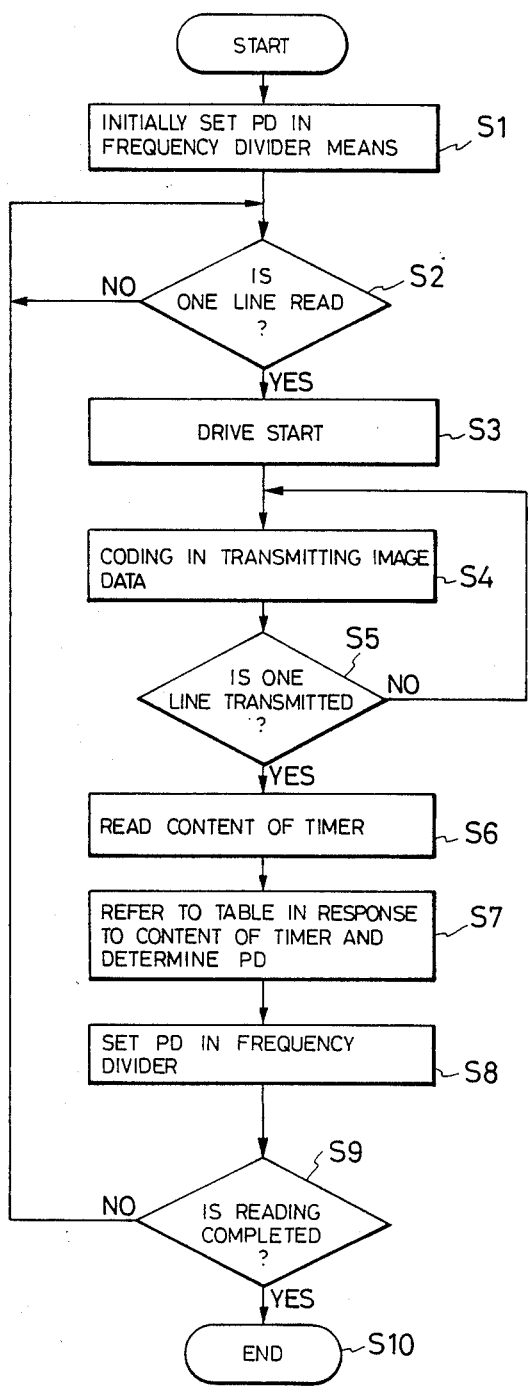
FIG. 3 is a flow chart showing the drive control procedure of the stepping motor of the embodiment.
Figure 4:
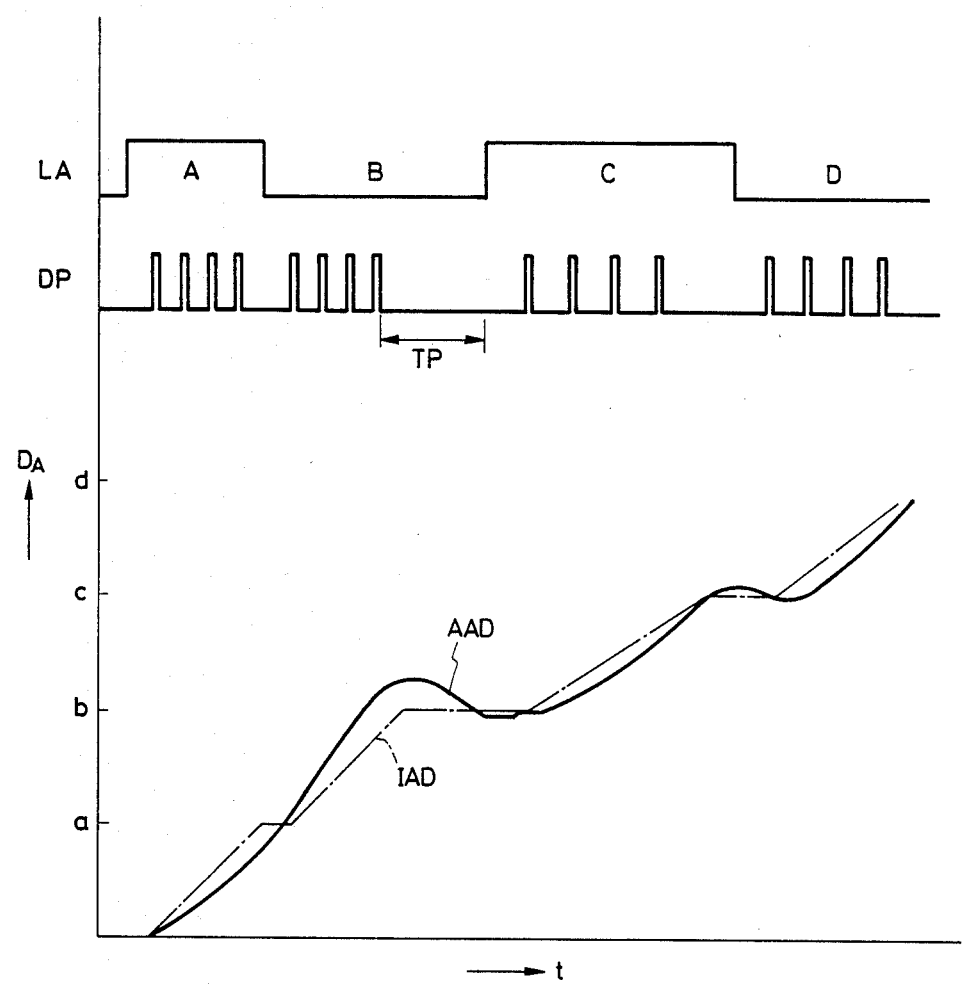
FIG. 4 is a waveform graph showing the manner of the axial displacement of the stepping motor of the embodiment.

FIG. 3 is a flow chart showing the drive control procedure of the stepping motor of the embodiment, and FIG. 4 is a waveform graph showing the manner of the axial displacement $D_A$ of the stepping motor of the embodiment.

In FIG. 3, at step S1, the initial pulse rate setting parameter PD is set in the frequency divider means 61. The value of this initial pulse rate setting parameter PD is determined, for example, on the basis of the minimum generation period of the line feed command of the system. Thus, the frequency divider means outputs the frequency-divided clock signal DCLK of initially set pulse rate. At step S2, one line of images is read by the reader unit R. When the reader unit R reads one line of image, advance is made to step S3, where a drive start signal ST is supplied to the control unit 6. Thereby, the counter means 62 starts counting, and generates a gate signal G from the point of time at which the counting has been started and causes the driver circuit 63 to output the first four drive pulse signals DP, whereafter it generates a pulse signal TR for resetting the timer means 5. Thus, the timer means 5 always counts the time from after the point of time at which the four drive pulse signals DP have been output (the time TP in FIG. 4).

On the other hand, at step S4, the CPU 1 MH-modes the read image data into transmission image data and transmits it onto the transmission line 9 through the transmitting means 4. At step S5, the termination of the transmission of the transmission image data corresponding to one line is waited for. When the transmission of one line is terminated, advance is made to step S6, where the content TP of the timer means 5 is read.

As is apparent from the reference to the section B of FIG. 4, the content TP of the timer means 5 at this point of time is indicative of the remaining time during which the four drive pulse signals DP have been distributed with respect to the section B. In the case of FIG. 4, the preceding section A is short and therefore the remaining time thereof is substantially 0, whereby on the assumption that the section b is also short, the drive pulse signals DP of the same pulse rate have been distributed with a result that with regard to the section B, the content TP of the timer means 5 has a certain magnitude. Such a variation is caused by a variation in the quality of image for each one line, but in the ordinary image, the quality of image varies gently and therefore, there will be no problem even if on the basis of the timer information of the section of the preceding line (e.g. the section A), the pulse rate of the section of the next line (e.g. the section B) is determined. Thus, the pulse rate of the drive pulse signals DP in each section is one which has been set by itself, and is consequently known and therefore, after all, this is similar to knowing the period at which the line feed command for each section is generated.

At step S7, reference is made to the table 21 of the ROM 2 on the basis of the read timer information TP and the pulse rate setting parameter PD of the next section is read out. Preferably, the content of the table 21 is statistically processed and determined as one to which the natures of the entire system (such as the fluctuation of the period of generation of the line feed command, the moment of inertia of the rotor and the frequency characteristic of damping) have been added, in such a manner that the drive pulse of the next section is not affected by the damping in the opposite direction resulting from the driving of the preceding section, on the basis, for example, of the data or the like actually measured at the stage in which the apparatus has been designed.

At step S8, said read-out pulse rate setting parameter PD is set in the frequency divider means 61. Thus, the frequency divider means 61 outputs a frequency-divided clock signal DCLK of a new pulse rate. At step S9, whether the reading of the original has been completed is examined, and if the reading has not been completed, return is made to the reading of the next one line (step S2). If the reading has been completed, advance is made to step S10, where the processing is terminated.

According to what has been described above, as shown in the section B of FIG. 4, any adverse effect on the drive pulse DP of the next section can be avoided even in a portion wherein damping occurs. Also, in a portion wherein the period of generation of the line feed command is long, the drive pulse DP is distributed with an allowance and the drive characteristic is good.

As described above, according to the present embodiment, the pulse rate is set in conformity with the time interval detected by the time detecting means and therefore, a predetermined amount of feed of the stepping motor in a system wherein the time interval of the generation of a feed command is not constant can be accomplished at a high speed and high accuracy and with high reliability and moreover, the phenomenon of disordered condition resulting from damping can be prevented at a low cost.

As described previously, according to the present invention, there can be provided a driving method for a stepping motor which can drive the stepping motor at high accuracy and a sheet conveying apparatus using such driving method.

I claim:

1. A driving method for a stepping motor provided with:
    the time detracting step of detecting the time interval between the generation of two drive commands;
    the rate setting step of setting a pulse rate in conformity with the time interval detected by said time detecting step; and
    the driving step of driving the stepping motor at the pulse rate set by said rate setting step.

2. A driving method according to claim 1, wherein said time detecting step is carried out by timer means for counting the time interval between the generation of two line feed commands for advancing a sheet.

3. A driving method according to claim 1, wherein said rate setting step is carried out by frequency divider means for frequency-dividing a reference clock signal in accordance with a pulse rate setting parameter supplied from a CPU in conformity with the time interval detected by said time detecting step, and counter means for counting a predetermined number of clock pulses in the frequency-divided clock signal output from said frequency divider means and also generating a gate signal of logic 1 while it is counting and generating a pulse signal when it stops counting.

4. A driving method according to claim 1, wherein said driving step is carried out by a driver circuit for amplifying and outputting a frequency-divided clock signal output by a section in which a gate signal generated by counter means is logic 1.

5. A sheet conveying apparatus for conveying a sheet by the use of a stepping motor, having:
    sheet conveying means for conveying a sheet;
    a stepping motor for driving said sheet conveying means;
    time detecting means for detecting the time interval between the generation of two sheet conveyance commands for conveying said sheet;
    rate setting means for setting a pulse rate in conformity with the time interval detected by said time detecting means; and
    driving means for driving said stepping motor at the pulse rate set by said rate setting means.

6. A sheet conveying apparatus according to claim 5, wherein said sheet conveying means is capable of conveying an original, and an image bearing surface of said original is read while being conveyed.

7. A sheet conveying apparatus according to claim 5, wherein said sheet conveyance commands are line feed commands for advancing the sheet.

8. A sheet conveying apparatus according to claim 5, wherein said rate setting means has frequency divider means for frequency-dividing a reference clock signal in accordance with a pulse rate setting parameter supplied from a CPU in conformity with the time interval detected by said time detecting step.

9. A sheet conveying apparatus according to claim 5, wherein said rate setting means has counter means for counting a predetermined number of clock pulses in a frequency-divided clock signal output from a frequency-divider means and also generating a gate signal of logic 1 while it is counting and generating a pulse signal when it stops counting.

10. A sheet conveying apparatus according to claim 5, wherein said driving means has a driver circuit for amplifying and outputting a frequency-divided clock signal output by a section in which a gate signal generated by counter means is logic 1.

11. A reading apparatus for reading information on the surface of an original, having:

original conveying means for conveying the original;

a stepping motor for driving said original conveying means;

reading means for reading the image bearing surface of the original conveyed by said original conveying means; time detecting means for detecting the time interval between the generation of two conveyance commands for conveying said original;

rate setting means for setting a pulse rate in conformity with the time interval detected by said time detecting means; and driving means for driving said stepping motor at the pulse rate set by said rate setting means.

12. A reading apparatus according to claim 11, further having transmitting means for transmitting data read by said reading means.

* * * * *

UNITED STATES PATENT AND TRADEMARK OFFICE
CERTIFICATE OF CORRECTION

PATENT NO. : 4,926,270

DATED : May 15, 1990

INVENTOR(S) : Sakamoto

It is certified that error appears in the above-identified patent and that said Letters Patent is hereby corrected as shown below:

[57] ABSTRACT
    Line 2, delete "is";
    Line 3, delete "to"; and
    Line 4, delete "a" (first occurrence).

COLUMN 1
    Line 21, delete "a"; and
    Line 59, "geration" should read --generation--.

COLUMN 5
    Line 5, "transmits" should read --transmit--; and
    Line 18, "section b" should read --section B--.

COLUMN 6
    Line 15, "detracting" should read --detecting--.

Signed and Sealed this

First Day of December, 1992

Attest:

DOUGLAS B. COMER

*Attesting Officer*    *Acting Commissioner of Patents and Trademarks*